(12) United States Patent
Lee et al.

(10) Patent No.: US 6,920,456 B2
(45) Date of Patent: Jul. 19, 2005

(54) METHOD, SYSTEM, AND PROGRAM FOR MAINTAINING INFORMATION IN DATABASE TABLES AND PERFORMING OPERATIONS ON DATA IN THE DATABASE TABLES

(75) Inventors: Taejae Lee, Cupertino, CA (US); Jy-Jine James Lin, Cupertino, CA (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 09/918,144

(22) Filed: Jul. 30, 2001

(65) Prior Publication Data

US 2003/0028550 A1 Feb. 6, 2003

(51) Int. Cl.[7] .............................................. G06F 17/30
(52) U.S. Cl. .................... 707/101; 707/10; 717/114
(58) Field of Search .................. 707/1–10, 100–104.1, 707/200–206; 717/114; 709/328

(56) References Cited

U.S. PATENT DOCUMENTS

| | | | |
|---|---|---|---|
| 5,301,320 A | 4/1994 | McAtee et al. ................. 705/9 |
| 5,535,322 A | 7/1996 | Hecht ............................. 705/1 |
| 5,572,673 A | 11/1996 | Shurts ........................ 713/200 |
| 5,596,744 A | 1/1997 | Dao et al. ..................... 707/10 |
| 5,634,053 A | 5/1997 | Noble et al. .................... 707/4 |
| 5,634,127 A | 5/1997 | Cloud et al. ................ 709/313 |
| 5,721,912 A | 2/1998 | Stepczyk et al. ........... 707/102 |
| 5,721,913 A | 2/1998 | Ackroff et al. ......... 707/103 R |
| 5,734,837 A | 3/1998 | Flores et al. ................... 705/7 |
| 5,745,683 A | 4/1998 | Lee et al. .................... 709/250 |
| 5,752,027 A | 5/1998 | Familiar ................. 707/103 R |
| 5,774,661 A | 6/1998 | Chatterjee et al. .......... 709/203 |
| 5,794,250 A | 8/1998 | Carino, Jr. et al. ............. 707/9 |
| 5,826,239 A | 10/1998 | Du et al. ....................... 705/8 |
| 5,860,066 A | 1/1999 | Rouse ............................ 705/1 |
| 5,864,843 A | 1/1999 | Carino, Jr. et al. ............. 707/4 |
| 5,873,083 A | 2/1999 | Jones et al. ..................... 707/4 |
| 5,913,214 A | 6/1999 | Madnick et al. .............. 707/10 |
| 5,926,636 A | 7/1999 | Lam et al. ................... 709/313 |
| 5,930,512 A | 7/1999 | Boden et al. ................ 717/102 |
| 5,937,388 A | 8/1999 | Davis et al. ................... 705/8 |
| 5,987,422 A | 11/1999 | Buzsaki ......................... 705/9 |
| 6,012,067 A | 1/2000 | Sarkar .................... 707/103 R |

(Continued)

FOREIGN PATENT DOCUMENTS

| | | |
|---|---|---|
| EP | 982675 | 8/1999 |
| WO | 9963469 | 12/1999 |
| WO | 0014618 | 3/2000 |

OTHER PUBLICATIONS

U.S. Appl. No. 09/918,185, filed on Jul. 30, 2001, entitled, "Method, System, and Program for Enabling Access to a Plurality of Services", invented by AT Yaung.

(Continued)

Primary Examiner—Mohammad Ali
Assistant Examiner—Jean Bolte Fleurantin
(74) Attorney, Agent, or Firm—David W. Victor; Konrad Raynes & Victor LLP

(57) ABSTRACT

Provided is a method, system, and program for maintaining workflow related information. At least one table is provided in a database storing workflow related data. A plurality of methods are provided, wherein each method specifies an operation to perform on the workflow related data in the at least one table, and wherein each method is associated with one stored procedure call. One stored procedure is provided in the database for each stored procedure call and corresponding method, wherein the stored procedure includes a plurality of database statements to perform the method operation. One stored procedure is executed in the database to perform the corresponding method operation on workflow related data in one table.

45 Claims, 10 Drawing Sheets

U.S. PATENT DOCUMENTS

| | | | |
|---|---|---|---|
| 6,044,378 A | 3/2000 | Gladney | 707/103 R |
| 6,065,009 A | 5/2000 | Leymann et al. | 707/10 |
| 6,073,109 A | 6/2000 | Flores et al. | 705/8 |
| 6,073,111 A | 6/2000 | Leymann et al. | 705/8 |
| 6,115,646 A | 9/2000 | Fiszman et al. | 700/181 |

OTHER PUBLICATIONS

U.S. Appl. No. 09/894,074, filed on Jun. 28, 2001, entitled, "Method, System, and Program for Generating a Workflow", invented by WF Miller and AT Yaung.

U.S. Appl. No. 09/894,413, filed on Jun. 28, 2001, entitled, "Method, System, and Program for Using Objects in Data Stores During Execution of a Workflow", invented by JJ Lin; WF Miller; and AT Yaung.

U.S. Appl. No. 09/918,204, filed on Jul. 30, 2001, entitled, "Method, System, and Program for Transferring Data From an Application Engine", invented by T. Lee and AT Yaung.

U.S. Appl. No. 09/918,143, filed on Jul. 30, 2001, entitled, "Method, System, and Program Workflow Related Operations", invented by T. Lee; JJ Lin; and AT Yaung.

U.S. Appl. No. 09/894,076, filed on Jun. 28, 2001, entitled, "Method, System, and Program for Executing a Workflow", invented by AT Yaung.

Galtzur, Z. et al. "Managing Workflow Using Database Techniques", IBM Technical Disclosure Bulletin, vol. 39, No. 08, Aug. 1996, pp. 199–201.

Yong, Y.M. "Template–Driven Document–Exchange Specification", IBM Technical Disclosure Bulletin, vol. 39, No. 11, Nov. 1996, pp. 173–178.

Duscher, R. et al. "Audit Trail Support For Program Activity Implementations of Workflow Management Systems", 1994, pp. 1–4.

Dr. Leymann, F. et al. "Context Support For Program Activity Implementations of Workflow Management Systems", 1994, pp. 1–4.

Sluiman, H. "A Relational Scheme to Support Task and Workflow, Data Collection and Analysis", pp. 1–3.

IBM Corp. "Chapter 4, Introducing Enterprise Information Portal Workflow" from *Managing Enterprise Information Portal*, IBM Enterprise Information Portal for Multiplatforms, Version 7.1, #SC27–0875–00, Product Nos. 5697–G29 and 5697–G31, Aug. 2000, pp. iii–iv and pp. 39–45.

IBM, Corp. "Concepts and Architecture" IBM MQSeries Workflow, Version 3.3, #GH12–6285–03, Product No. 5697–FM3, Mar. 2001, pp. iii–58.

IBM, Corp. "User's Guide for the Work Management Builder" IBM ImagePlus Workfolder Application Facility for AS/400, Version 4 Release 1, #SC34–4587–00, Program No. 6733–A18, Sep. 1997, pp. iii–119.

Su, SYW et al. "An Extensible Knowledge Base Management System for Supporting Rule–based Interoperability among Heterogeneous Systems" 1995, ACM # 0–89791–812–6/95/11, pp. 1–10.

Johansson, SE et al. "Expert Workflow, Building Knowledge–Based Workflow Systems with Object Technology", 1997, pp. 45–49.

Leymann, F. et al. "Workflow–based Applications" [online], vol. 36, No. 1—Application Development, pp. 1–22, plus 9 pages of linked Figures (drawings), and 2 pages of "Cited References and Notes". [Retrieved on May 17, 2001], Retrieved from the Internet et <URL: http://www.research-.ibm.com/journal/sj/361/leymann.html>.

Vossen, G, "The WASA2 Object–Oriented Workflow Management System", 1999, ACM # 1.58 110–084–8/99/05, pp. 587–589.

METHOD, SYSTEM, AND PROGRAM FOR MAINTAINING INFORMATION IN DATABASE TABLES AND PERFORMING OPERATIONS ON DATA IN THE DATABASE TABLES

RELATED APPLICATIONS

This application is related to the following copending and commonly assigned patent application, which are incorporated herein by reference in their entirety:

"Method, System, and Program for Generating a Workflow", having application Ser. No. 09/894,074 and filed on Jun. 28, 2001;

"Method, System, and Program for Using Objects In Data Stores During Execution of a Workflow", having application Ser. No. 09/894,413 and filed on Jun. 28, 2001;

"Method, System, and Program for Executing a Workflow", having application Ser. No. 09/894,076 and filed on Jun. 28, 2001; and "Method, System, and Program for Performing Workflow Related Operations", having application Ser. No. 09/918,143 and filed on the same date herewith.

BACKGROUND OF THE INVENTION

1. Field of the Invention

The present invention relates to a method, system, and program for maintaining information in database tables and performing operations on data in the database tables.

2. Description of the Related Art

A workflow program allows businesses and other organizations to define their business operations as a computer model known as a workflow. A workflow defines a series of processes to be performed by users at a client computer. The user activities at the client computers may involve updating an electronic form, reviewing information, etc. After one user in the workflow performs a specified action, the work item or other information is then routed to one or more further nodes where further action may be taken. For instance, an on-line purchase of a product may involve numerous steps, such as receiving the customer order, routing the customer order to the credit department to process the bill and then routing the order to the shipment department to prepare the shipment. Once the shipment is prepared, the product may be shipped and information on the purchase is then transferred to the customer service department to take any further action. Each of these processes may be defined as nodes in a workflow. A workflow program would then route the customer order to the business agents designated to handle the job. For instance, the initial order would be received by the order department and then routed to a person in shipping and billing. Once the bill and package are prepared, a further invoice may be forwarded to shipping. After shipping sends the package, the shipping agent may then enter information into the invoice and forward the electronic invoice to customer service for any follow up action.

A workflow is designed using workflow software, such as the International Business Machines Corporation (IBM) MQSeries** Workflow software product. A process modeler is a person that analyzes the business operations, determines how the information related to the operations is routed electronically to client computers, and then defines a workflow model of the operations. The MQSeries Workflow provides a buildtime tool used to create a workflow. The workflow model created using this buildtime tool is coded in the FlowMark Definition Language (FDL). The FDL comprises an ASCII file including processing actions to perform on workflow objects to implement a workflow. The FDL file including a workflow design is stored in a buildtime database. Workflow models in the buildtime database are then exported from the buildtime database into the MQSeries runtime database for execution. An import/export utility is provided to access the FDL workflow files from the buildtime database. This utility provides an involved language and syntax for invoking the utility to import and export FDL files. Further details of the buildtime database are described in the IBM publication "Getting Started With Buildtime, Version 3.3", IBM document no. SH12-6286-05 (Mar. 2001)

Notwithstanding current techniques for managing FDL files, there is a need in the art for further flexible and easy to use tools for manipulating FDL files in the runtime database.

SUMMARY OF THE PREFERRED EMBODIMENTS

Provided is a method, system, and program for maintaining workflow related information. At least one table is provided in a database storing workflow related data. A plurality of methods are provided, wherein each method specifies an operation to perform on the workflow related data in the at least one table, and wherein each method is associated with one stored procedure call. One stored procedure is provided in the database for each stored procedure call and corresponding method, wherein the stored procedure includes a plurality of database statements to perform the method operation. One stored procedure is executed in the database to perform the corresponding method operation on workflow related data in one table.

In further implementations, there are a plurality of tables including workflow related data. In such case, a set of methods is provided for each table including workflow related data, wherein each set of methods defines a same set of operations to perform on the table for which the set is provided. Further provided are stored procedure calls and stored procedures in the database for each set of methods to implement the method operations in the set.

Still further, the workflow related tables comprise: a workflow file table, wherein each entry includes one workflow file including code defining a workflow and nodes of the workflow; a worklist table, wherein each entry includes a worklist associated with a plurality of work items performed at the nodes defined in the associated workflow files; and an action list table, wherein each entry includes a list of actions capable of being performed at the nodes defined within one workflow file in the workflow file table.

Further provided is a method, system, and program for maintaining information in a database. Column definitions are received for multiple columns in at least one table. For each table for which column definitions are received, a table is generated in the database including one column for each column definition, wherein each column is generated with attributes specified by the column definition for which the column is generated. At least one stored procedure is generated including database statements in the database to perform an operation on the data in the generated table, wherein the stored procedure is capable of accessing the columns generated according to the column definitions.

The described implementations provide techniques for accessing workflow related data in database tables using methods that invoke stored procedure calls, which further invoke stored procedures that execute to perform database operations on the workflow related data. The workflow related data may be generated by a workflow builder. Further implementations provide a technique for generating the tables and stored procedures from column definitions provided by an application or user.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
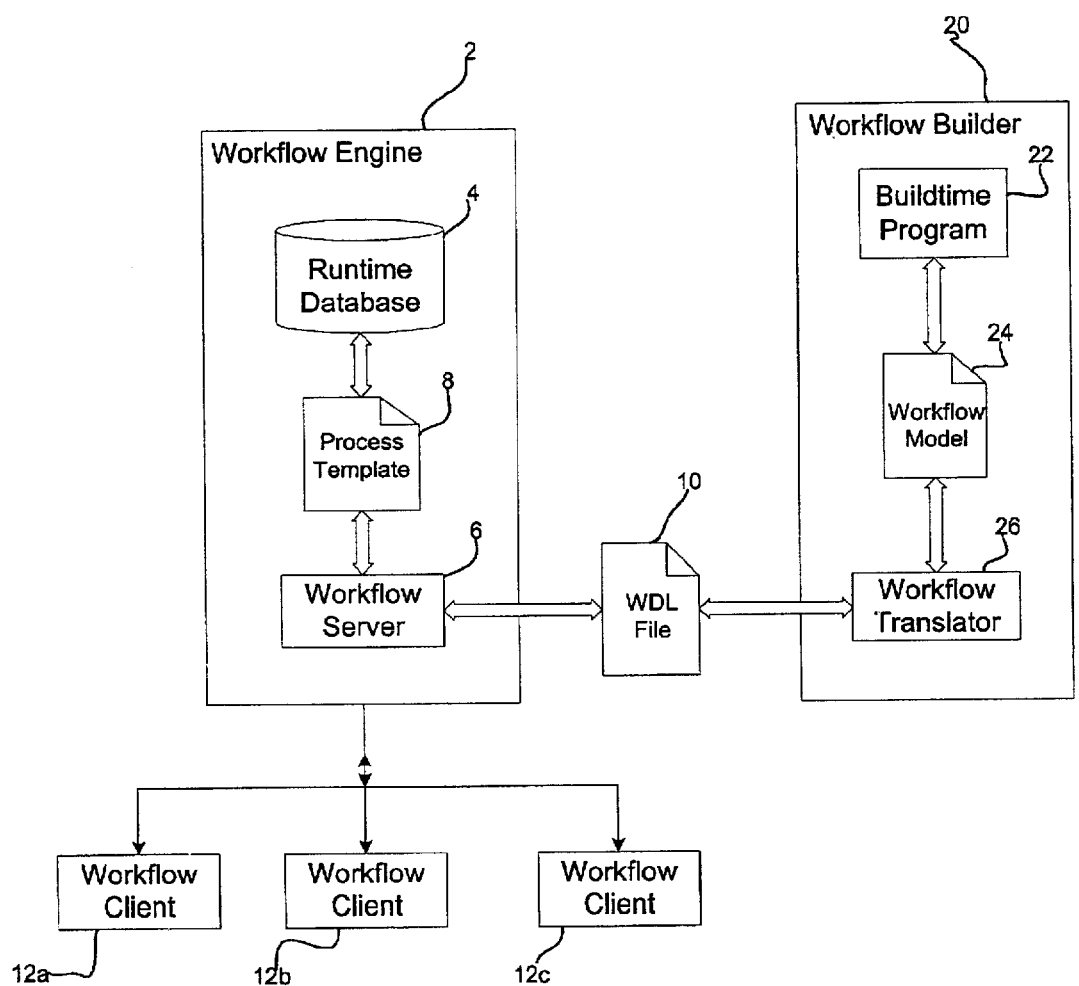
FIG. 1 illustrates a workflow computing environment in which aspects of the invention are implemented.

FIG. 1 illustrates a workflow environment implementation in which the invention is realized. A workflow engine 2 includes a runtime database 4 and a workflow server 6, such as the IBM MQSeries Workflow server. The workflow server 6 is capable of transforming a workflow model coded in a workflow definition language (WDL) file 10, such as FDL, into a process template 8 implemented in the runtime database 4. The runtime database 4 stores database tables that implement the data structures that provide the status and setup information needed for workflow process execution. Whenever the state of a process activity changes, such information is recorded in the runtime database 4. The runtime database 4 may be implemented using any database program known in the art, such as IBM DB2.**

The workflow server 6 coordinates and manages the execution of processes for a defined process template 8. The workflow server 6 executes any programs associated with a process defined for the workflow, interprets the process definitions, creates process instances and manages their execution, manages processes and states, logs events, communicates with users as part of the workflow, etc. The workflow server 6 may include a database client program (not shown) to access and update records related to the workflow being processed maintained in the runtime database 4. The workflow server 6 processing may be distributed across multiple computers to achieve workload balancing.

The workflow clients 12a, b . . . n represent the client computers that execute workflow application program interfaces (APIs) to perform workflow related actions and activities and return messages to the workflow server 6. The workflow clients 12a, b . . . n thus comprise instances of the workflow code on the client computers that allow users to interface with the executing workflow and the workflow server 6. The workflow server 6 would execute activity programs as part of executing the workflow and transmit messages and data to the workflow client 12 to request user action to proceed with the workflow. The actions associated with the nodes and executed by the workflow server 6 may comprise Java servlets. The workflow client 12 may comprise a Web browser capable of executing Java scripts transferred from the Java servlet executing on the workflow server 6. Further, details on implementations and interactions of the workflow server 6 and client 12 are described in the IBM publication "IBM MQSeries Workflow: Concepts and Architecture, Version 3.3", IBM document no. GH12-6285-03 (March, 2001), which publication is incorporated herein by reference in its entirety.

A workflow builder 20 comprises a system including a buildtime program 22 that implements a plurality of graphical user interface (GUI) panels in which a user may define the components of a workflow model 24. A workflow translator 26 converts the workflow model 24, with the defined workflow components, into a workflow definition language (WDL) file 10 that implements the workflow model 24. The workflow definition language (WDL) may comprise the FlowMark Definition Language (FDL), Workflow Process Definition Language (WPDL) or any other workflow definition language known in the art that is used to define workflows. The workflow translator 24 would transfer the WDL file 10 to the workflow server 6 to transform into a process template 8 in the runtime database 4 in a manner known in the art. Further details of using the buildtime program 22 to build workflows are described in the copending and commonly assigned patent application "Method, System, and Program for Generating a Workflow", having docket no. STL920000044US1, which application was incorporated herein by reference above.

The workflow engine 2, and each of the program components therein, such as the runtime database 4 and workflow server 6, may be implemented in one or more computing machines. The workflow clients 12 which provide the workflow interface to users may be implemented on one or more client machines. The workflow builder 20, including the buildtime program 22 and workflow translator 26 programs, may be implemented on one or more computing machines. Any portion of the workflow engine 2, workflow builder 20, and/or workflow client 12, and program components therein, may be implemented on the same computing machines or separate machines. The computing machines used to implement the workflow engine 2, workflow clients 12, and workflow builder 20 may comprise any computing device known in the art, such as a server, workstation, mainframe, personal computer, laptop computer, hand held computer, telephony device, etc.

One use of a workflow is to generate a final product, which may comprise the result of the effort of a single business unit or the cumulative efforts of multiple users and units within an organization. To produce the final product, a workflow packet comprised of one or more documents would transfer through various user work stations in the company defined as nodes in the workflow to require the user associated with such node to handle and process and forward to another user to handle. A document is comprised of a multimedia item that has digital content.

For instance, an insurance company may have to process numerous documents related to an insurance claim, such as photographs, appraisals, expert reports, etc. Employees may spend a substantial amount of time sorting through documents and associating the documents with particular claims. In the workflow model, all the documents related to a single claim would be part of a work packet that may move through various user stations to review and process. The workflow would comprise the flow of work and actions that are performed on the documents or workflow packet by multiple users in the system.

The workflow defines the sequence and boundaries of how the work is performed with respect to the documents in the workflow packet, and any restrictions on the order in which documents in the workflow packet must be processed. For instance, before the claim can proceed to a further step, a claims adjuster might be required to ensure that certain documents are included in the workflow packet for the claim before the workflow packet can proceed to further nodes in the workflow, e.g., determining the amount of compensation.

In workflow terminology, a worklist is a queue of work items. Each work item comprises a unit of work for a node in the workflow that is performed by the users associated with that node. Each work item may be associated with one work packet, which comprises documents or objects that are processed during the work defined for that work item. When a user at one node accesses the work item to perform the work defined therein, that work item is locked, thereby preventing others at that node from accessing the work item.

A worklist, which is a queue of work for the users of the organization to perform with respect to the workflow packet. The work items within the worklist can be handled by any of the employees/users assigned to the worklist. An action list defines the actions that a user can perform on the work packet objects associated with the work item, such as selections or data that may be entered in the work packet. For example, an adjuster in the claim process workflow can select an option to continue consideration of the claim if it appears valid or select an option to reject the claim. The workflow further consists of the paths defined as the connections between nodes which indicate the order of execution of nodes in the workflow.

An action list may be associated with a workflow that provides a list the actions that can be invoked at the nodes in the defined workflow. The actions may comprise programs that are executed at a particular node. In certain implementations, the actions comprise Java methods, also referred herein as programming interfaces, that the workflow server 6 executes when control proceeds to the node with which the method is associated. Action in the list would be associated with particular nodes. An access list defines a mapping of users that can be assigned to nodes to perform the action associated with such node. An notification feature causes a message to be sent to a specified user if the user associated with a node has not performed the action defined for the node within a specified time frame.

One or more actions and a user with are associated with the work nodes in the workflow. The work nodes defined for the workflow may comprise a decision point node, collection point node, document node, and assign value node. A decision point node causes the workflow to proceed along a branch of execution based on selection by the user or some other action taken by an external application called at a previous work node. For instance, the path taken to the next node in the workflow may vary if the claim adjuster selects to reject the claim as opposed to approving the claim. A collection point node is a work node where certain documentation is gathered and added to the work packet. The collection node holds and manages work packages that cannot be processed completely until additional information is received. A document node represents a document in the workflow.

Figure 2:
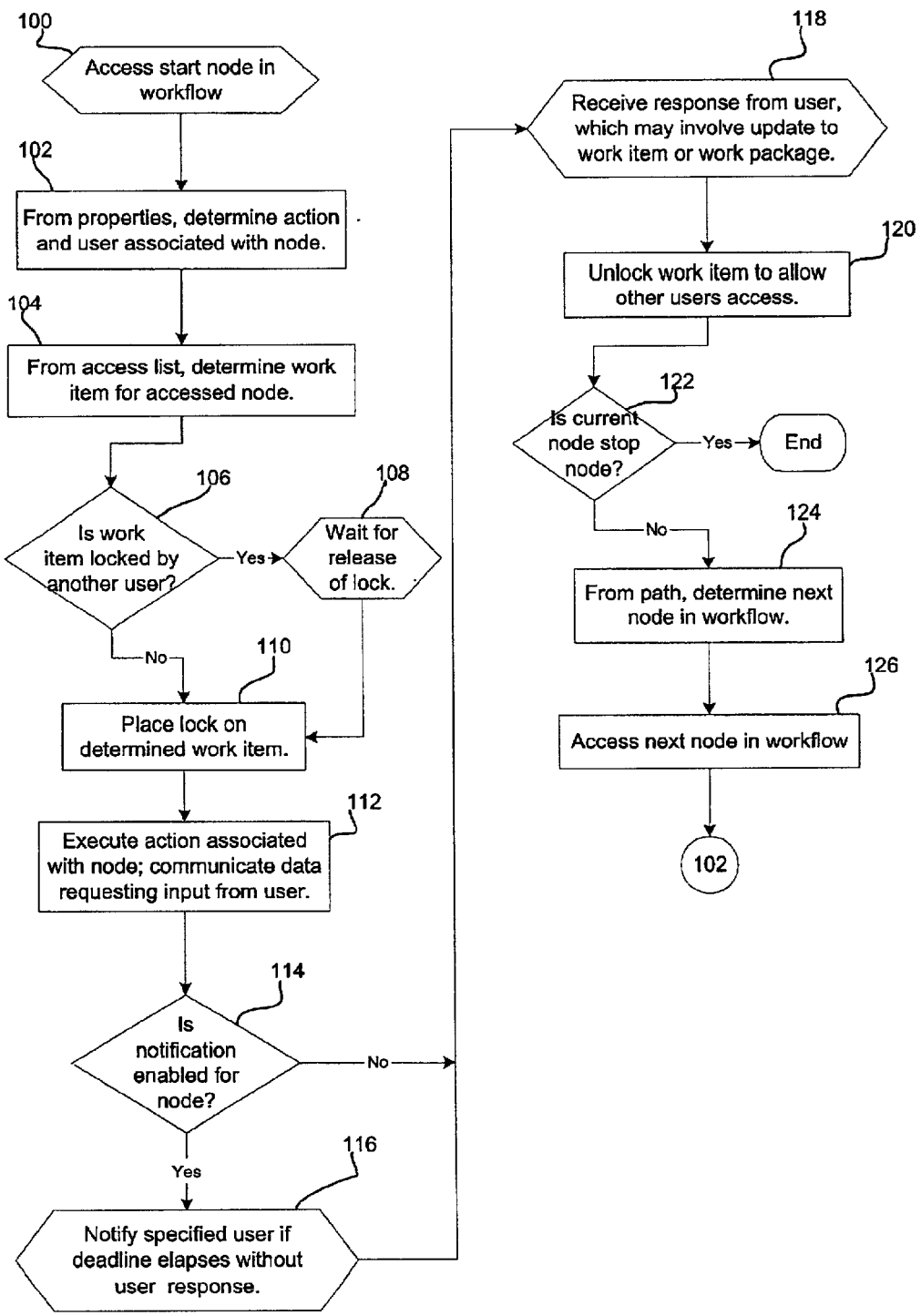
FIG. 2 illustrates logic performed by a workflow server to execute a workflow in accordance with implementations of the invention.

In certain implementations, the workflow model 24 defined using the buildtime program 22 is document centric in that the actions performed at the node concern the processing of work packages that may comprise any content or object that is processed and routed through the workflow. FIG. 2 illustrates the logic performed by the workflow server 6 to execute a workflow. When a user invokes a workflow stored in the runtime database 4, the workflow server 6 accesses (at block 100) the start node of the invoked workflow by interacting with the runtime database 4 in a manner known in the art. From the properties defined for that node, the workflow server 6 determines (at block 102) the actions and user associated with the node. The workflow server 6 further processes (at block 104) the access list defined for the workflow to determine the work item for the accessed node. If (at block 106) the determined work item currently accessed in the workflow is locked by another user at that node, then the workflow server 6 waits (at block 108) for the lock on the work item(s) to be released. If the work item is not locked or after the lock is released, control proceeds to block 110 where the workflow server 6 places a lock on the determined work item. The workflow server 6 then executes (at block 112) the action associated with the node and communicates data to the workflow client 12 of the determined user requesting user action.

If (at block 114) notification is enabled for the current node and the deadline has passed (at block 116) without receiving a response from the user, then the workflow server 6 notifies the user specified with the enable notification that the deadline has passed. Upon receiving (at block 118) a response from the user, which may comprise entering information, modifying a work item, adding a work item to the work package, selecting an option, etc., the workflow server 6 unlocks (at block 120) the work item(s) previously locked for the user. If (at block 122) the current node is the stop node, then control ends; otherwise, if there are further nodes to process in the workflow, then the workflow server 6 determines (at block 124) from the path from the current node the next node in the workflow and accesses (at block 126) the next node. Control then proceeds back to block 326 to process the next node.

The workflow logic of FIG. 2 provides a document centric workflow in that the state of processing work items associated with the node controls the workflow because control cannot proceed to other subsequent nodes that process the locked work item until the node holding the lock completes execution and releases the lock on the work item. Thus, access to work items controls the flow through the workflow.

With the described implementations, the workflow builder 20 generates a WDL file 10 that may be compatible with workflow engines from different vendors because different vendors may design their workflow engines to be compatible with the WDL format of the WDL file 10. This allows the workflow model defined in the WDL file 10 to be transportable across different vendor workflow engine platforms.

Object Oriented Workflow Architecture

Figure 3:
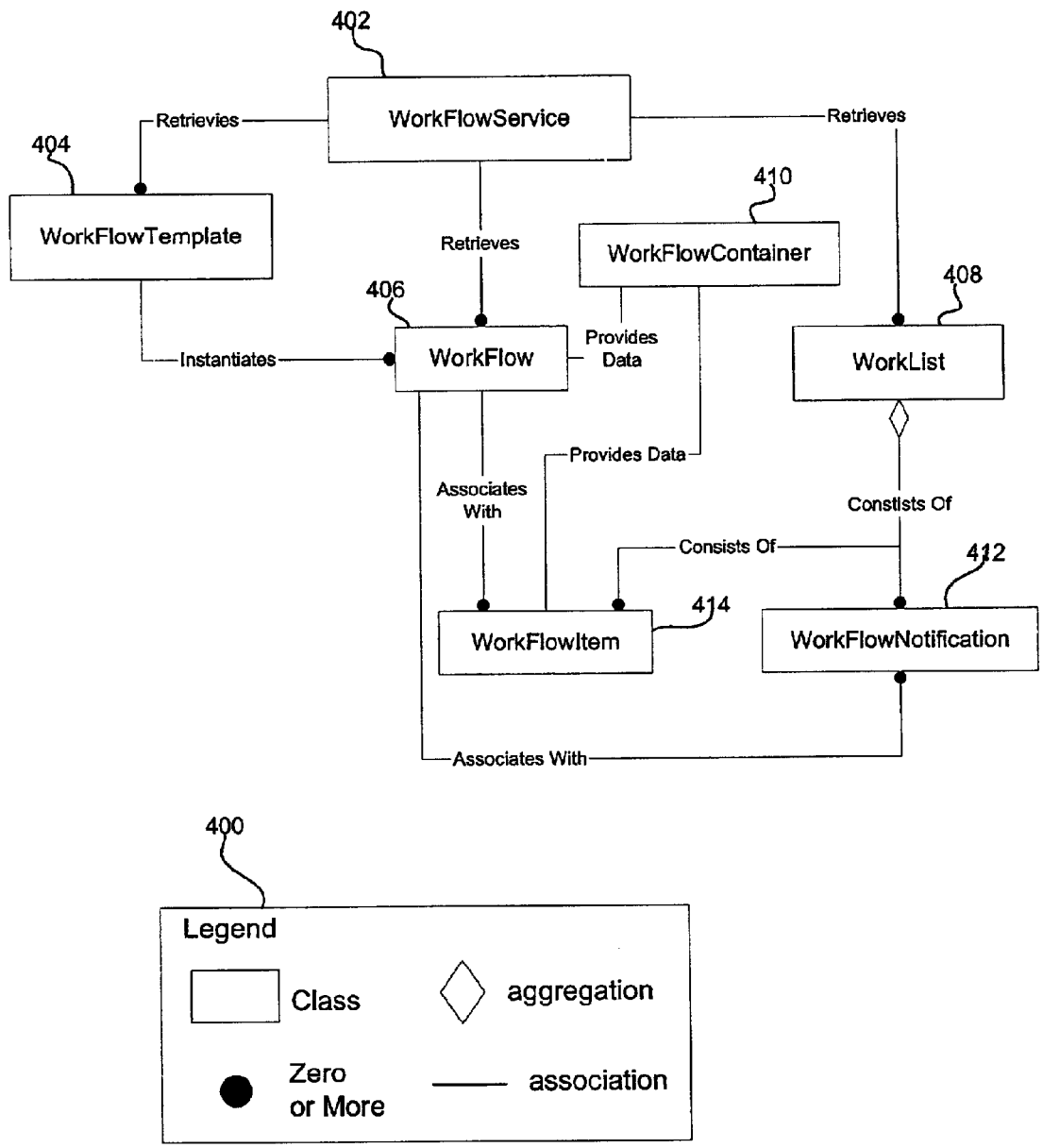
FIG. 3 illustrates an architecture of object oriented classes for implementing a workflow in accordance with implementations of the invention.

FIG. 3 illustrates an architecture of object oriented classes and their interrelationship that are used to implement a workflow of nodes. As indicated in the legend 400, a rectangle indicates a class; a line connecting classes indicates an association of the connected classes; a line connecting classes terminating in a filled circle indicates that there may be one or more instances of the class at the end with the circle for each instance of the class at the other end of the line; and a line terminating at a diamond indicates that the class at the diamond end is an aggregate, such that the aggregate object is made up of one or more instances of the class at the other end of the line. FIG. 3 illustrates the relationship of the classes.

The WorkFlowService class 402 is the starting point for a user wanting to access a workflow. The WorkFlowService class 402 includes methods that allow users to access already defined workflow templates and executing workflows. The WorkFlowService class 402 is associated with the WorkFlowTemplate 404, WorkFlow 406, and WorkFlowList 408 classes. The WorkFlowTemplate class 404 provides methods that allow the user to manipulate workflow process template objects, e.g., process template 8 (FIG. 1), which comprise a defined workflow that is stored in the workflow engine 2. The WorkFlow class 406 provides methods that allow the user to access information and control an executing workflow. The WorkList class 408 includes methods that allow the user to access an executing worklist object comprised of work items and information on the current state of the executing worklist, i.e., information on work items being processed. The methods in the WorkFlowService class 402 are used to retrieve information on particular workflows, workflow templates, and workflow lists associated with a particular workflow service. The methods from the other classes, such as the WorkFlowTemplate 404, WorkFlow 406, and WorkFlowList 408 classes, can then be used to obtain specific information and control over those workflow templates, workflows, and workflow lists identified by the WorkFlowService class 402 methods.

The WorkFlowTemplate class 404 provides information on a workflow template. A workflow object from the WorkFlow class 406 represents an executing workflow. The WorkFlowContainer class 410 includes methods to instantiate a container object that includes information on one container used to transfer data between nodes. Users at nodes may access data in the container and update the container with additional data. The data in the container may be used by the action being executed at a node. The WorkFlow class 406 is associated with the WorkFlowNotification class 412, which is used to provide notifications, such as notifications if a user does not perform an action at a node within a predefined time period. There may be many notifications provided for one workflow. The WorkFlow class 406 is further associated with the WorkFlowItem class 414, such that one executing workflow may be associated with one or more work items indicating a unit of work to perform for a node within the workflow. The WorkFlowItem class 414 is associated with the WorkFlowContainer class 410, such that one container may be used at a work item to provide data to the user executing the unit of work defined by the work item. The relationship between the WorkFlow class 406 and the WorkFlowItem class 414 indicates that there may be many work item objects associated with one executing workflow. The class architecture of FIG. 3 further illustrates that a workflow list of the WorkFlowList class 408 is an aggregate of the workflow from the WorkFlow 414 Item class and workflow notifications from the WorkFlowNotification 412 class.

The above object oriented architecture of FIG. 3 defines how the different classes interrelate in order to implement a workflow. Each of the above interrelated classes 402, 404, 406, 408, 410, 412, and 414 provides interfaces/methods that may be used within a workflow computer program to implement the workflow and actions performed at a node. The workflow program would be executed by the workflow server 6 (FIG. 1) in the workflow engine 2.

Following are examples of some methods of the WorkFlowService class 402, including:

WorkFlowService( ): constructs a new workflow service, which provides access to different workflow services in the workflow engine 2 (FIG. 1). Each workflow service is associated with workflow templates, executing workflows, and workflow lists of work items for a workflow.

connect: provides a user name, authentication, and connection string to use to authenticate a user to provide access to a requested workflow service, which allows access to workflow templates, worklists, etc.

connection: handle returned to a user to allow access to a particular workflow service.

setDatastore: a reference to a data store including documents and objects used by the work items in the workflows associated with the workflow service. Thus, different workflows for a workflow service may process documents within workflow packages from the same data store.

listWorkFlows: returns a list of all workflow objects of the WorkFlow class 406.

listWorkLists: returns a list of all worklist objects of the WorkFlowList class 408.

listWorkFlowTemplates: returns a list of all template objects of the WorkFlowTemplate class 404.

Following are examples of some methods of the WorkFlowService class 402, including:

WorkFlowTemplate( ): constructs a workflow template object including a defined workflow. This workflow template may be created using the GUI panels and buildtime program described above.

name: returns name of a workflow template.

description: returns a description of the work performed by a workflow template.

modifiedTime: time the workflow template was last modified.

Following are examples of some methods of the WorkFlow class 406, including:

WorkFlow( ): constructs a workflow object representing a workflow comprised of nodes and work items for a specified workflow. The workflow may also be provided a container that is used to allow users of different work items to communicate and/or a work packet comprised of one or more documents or objects to be processed as part of the workflow.

get/setName: returns or sets the name for a workflow.

workFlowTemplateName: returns the name of the workflow template associated with the workflow.

notificationTime: returns the time of the last notification generated for the workflow in response to a user not performing an action for one accessed node within a specified time period.

modifiedTime: Returns the last time the workflow was modified.

stateChangeTime: returns the last time a state change occurred with the workflow:

startTime: returns the time the workflow was started.

endTime: returns the time the workflow ended.

state: returns a state of the workflow, such as ready, running, finished, terminated, suspended, terminating, suspending, deleted, etc.

inContainer: returns the input container associated with the workflow.

start: starts a workflow with a container if the state is ready.

terminate: terminates the workflow if the state is running, suspended, or suspending.

suspend: suspends the workflow if the state is running.

resume: resumes a suspended workflow if the state is suspended and suspending.

add: adds a workflow to the system that is associated with one specified workflow template.

Following are examples of methods of the WorkFlowContainer class 410, which instantiates a container object used with a workflow to transport information among the nodes.

WorkFlowContainer( ): constructs a container object for a container used within a particular workflow.

get/setPriority: get/sets the priority for an item in the container.

get/setActivityNode: get/sets the current node being processed, may also get/set information on the current activity node.

get/setWorkPacketID: get/sets an identifier of a work packet being routed through the system.

get/setActionPerformed: get/sets information on an action being performed.

get/setUserVariable: get/sets a variable maintained in the container, that may have predefined values. The priority is maintained for a user variable in the container.

retrieve: retrieves and refreshes the container.

update: updates the container data.

Following are examples of some methods of the WorkList class 408, where a worklist object is a representation of a worklist in the system. As discussed, a worklist object comprises a collection of work items and notifications for an executing workflow.

WorkList( ): constructs a worklist object for a specified worklist. A worklist consists of work items.

get/set ACLName: get/sets the action control list (ACL) name for the worklist including the actions that may be performed as part of units of work for the worklist.

listWorkItems: lists the work items on the worklist.

listWorkItemsByTemplate: returns the work items for the worklist by the specified workflow template name.

listWorkItemsByNode: returns a list of the work items assigned to each node in the work flow.

listProcessNotifications: lists notifications generated during workflow that are associated with the workflow process. For instance, the notification may provide a general notification for the workflow. In certain implementations, a notification process is activated and performed as a background process to generate notifications.

listActivityNotifications: lists notifications generated during workflow that are associated with a particular activity, such as a user not performing an activity within a specified time. For instance, the notification may enable notifications for activities at particular nodes.

add/update/delete/retrieve: separate commands that allow user to add, update, delete, and retrieve a worklist.

Additional commands may be provided to access the information in the worklist, such as filter commands to provide filters for accessing information from the worklist, thresholds of the number of items that can be in the worklist, etc.

Following are examples of some methods of the WorkFlowItem class 414, where a work item object represents a unit of work performed in the workflow. The following methods are used to create and modify work items, and obtain information thereon.

WorkFlowItem( ): constructs a work item for a specified workflow, node, and owner.

name: returns the name of the node to which the work item is assigned.

state: returns a state of the work item, such as not set, ready, running, finished, terminated, suspended, disabled, checked out, in error, executed, etc. A work item is checked out when a user has accessed the work item to perform the actions defined for the work item.

workFlowName: returns the name of the workflow including the work item.

workFlowTemplateName: returns the name of the workflow template including the work item.

priority, owner, notificationTime, startTime, creationTime, modifiedTime:

methods that return information on the priority, owner, time of last notification, time of creation and time of last modification for a work item, respectively.

retrieve, start, finish: methods used to retrieve, begin executing, and complete a work item, respectively.

checkIn, checkOut: checkOut locks a work item to prevent other users at a node from accessing the work item and changes the state of the work item to checked out. Upon check out, the container associated with the work item is accessed from the previous node using the inContainer method. The checkIn method receives the completed work item from the user, releases the lock, and provides the container to route to the next node.

inContainer: method that obtains container from previous node for use with work item checked out at current node being processed.

outContainer: method generates an out container to include contents of container user accessed at work item, including any changes made by the user to the data in the container. A handle of the out container is generated and provided with checkOut method called for the next node to provide that container to the user of the next node in the workflow.

Following are examples of some methods of the WorkFlowNotification class 412, where a notification object represents a generated notification. The following methods are used to create and modify notifications, and obtain information thereon.

WorkFlowNotification( ): constructs a notification object having a specified notification name, notification type, and owner name for a specified workflow service and workflow. The notification type indicates how the owner is notified.

state: returns a state of the notification, such as not set, ready, running, finished, terminated, suspended, disabled, etc.

priority, owner, notificationTime, startTime, creationTime modifiedTime, receivedTime: these methods return the priority of the notification, owner of the notification, time that must elapse before the notification is generated, time the notification started, time the notification was crated, time of last notification to the notification, time the notification was received, respectively. The notification would be started and executed as a background process.

receiveReason: returns a received reason for the notification.

retrieve cancel: methods that retrieve and cancel a notification, respectively.

transfer: transfers a notification to a specified user. In this way, a notification can be transferred from the current owner to some other user.

The above described methods and classes would be included in a workflow program executed by the workflow server 6 (FIG. 1) to execute the workflow. The methods described above would be used to access and modify the workflow related objects, such as the workflow, work items, notifications, containers, etc. when running the workflow. The above described methods may also be used in other programs that can obtain information and status on a workflow.

Figure 4:
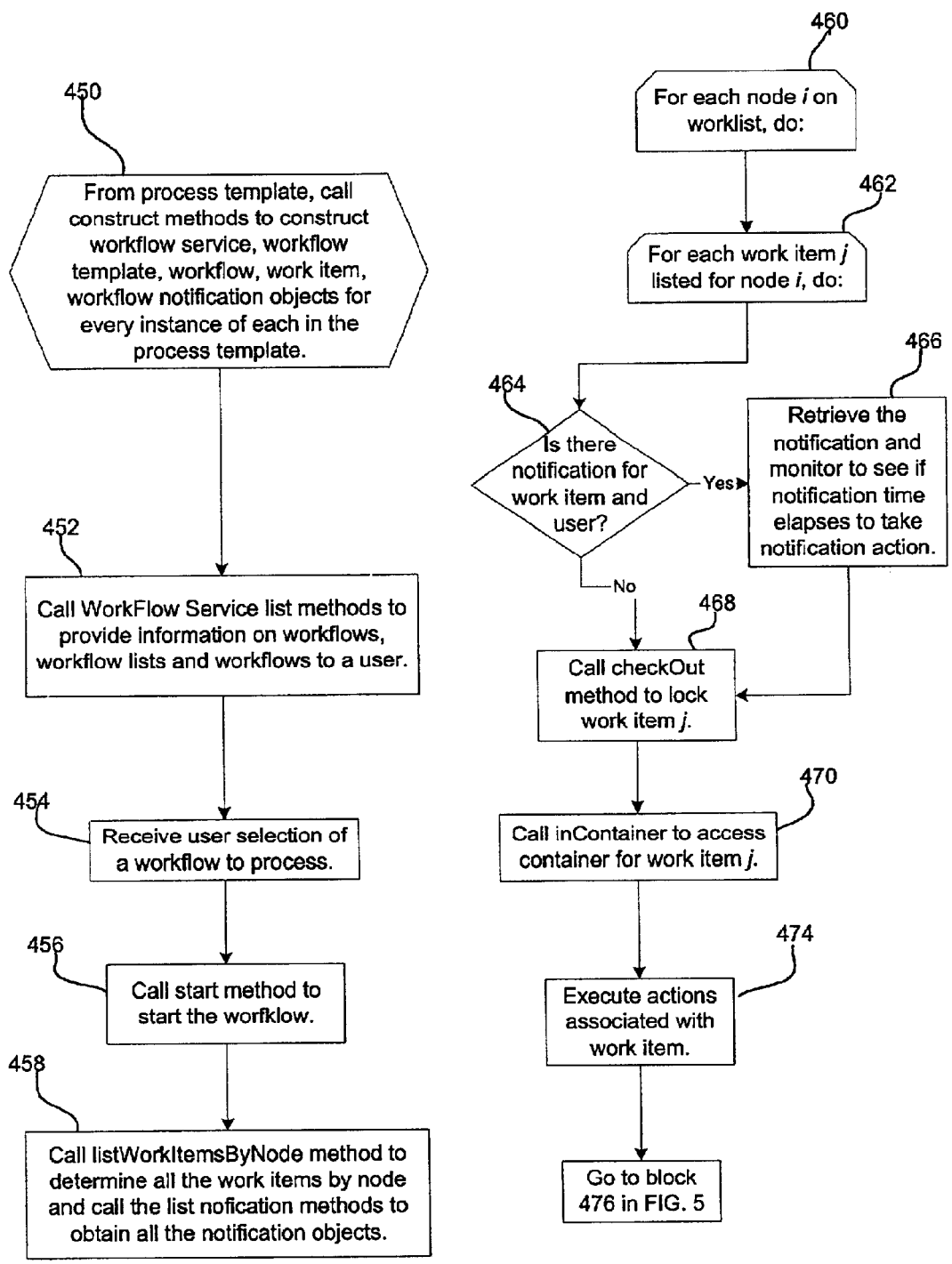
FIGS. 4 and 5 illustrate logic to utilize the methods and objects from the object oriented class architecture of FIG. 3 to execute a workflow in accordance with implementations of the invention.
Figure 5:
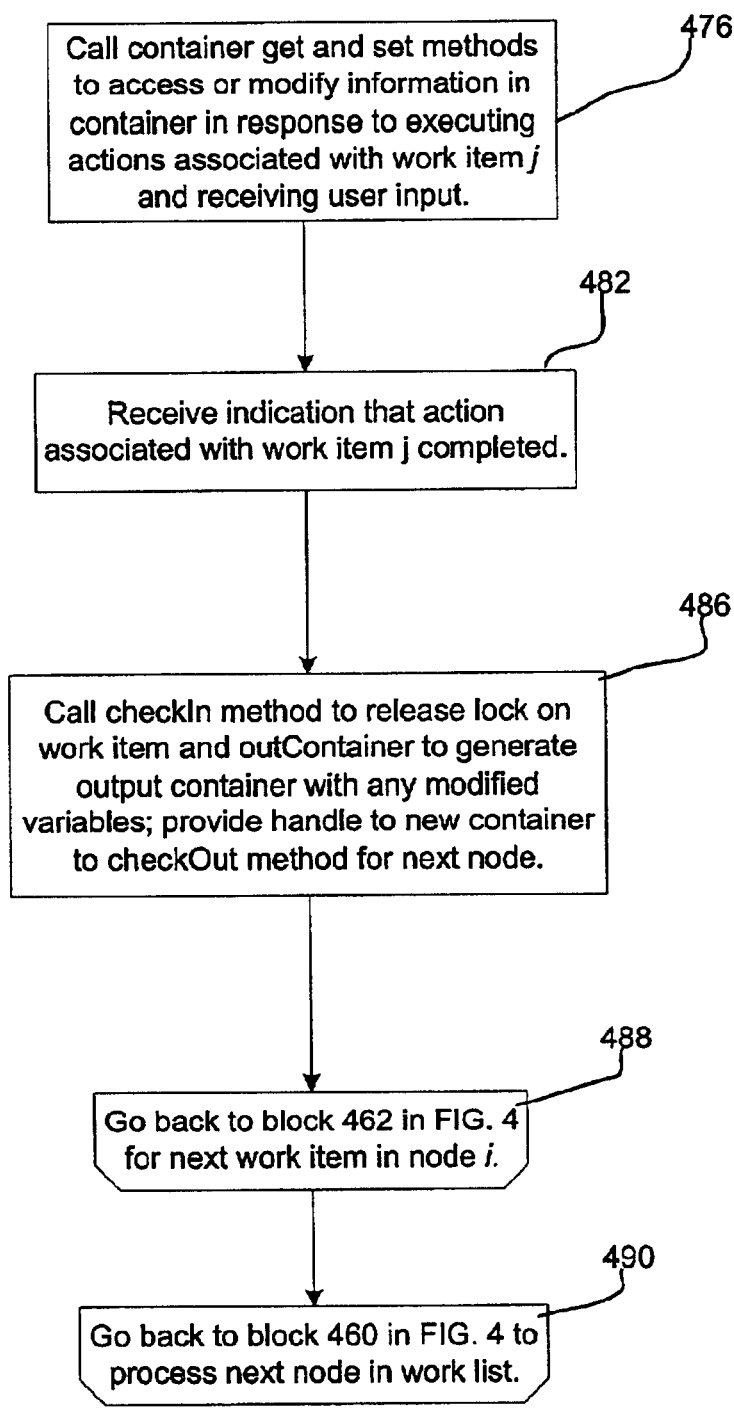

FIGS. 4–5 illustrate an example of program logic in a workflow program executed by the workflow server 6 (FIG. 1) utilizing the above discussed methods to implement a workflow. With respect to FIG. 4, control begins at block 450 where the program calls the constructor methods, WorkFlowService( ) to construct a workflow service object. The workflow program would then call (at block 452) the WorkFlowService list methods, such as listWorkFlows, listWorkLists, listWorkFlowTemplates, to obtain information on the workflows, workflow templates, and worklists for a workflow service. This information may then be presented to a user for selection. Various other methods in the classes may be called to access information on the workflow to present to the user when making a decision on which workflow to execute.

At block 454, user selection of a workflow to process is received. The workflow program then calls (at block 456) the WorkFlow start method to start the workflow. The workflow program then calls (at block 458) the listWorkItemsByNode method to obtain all the work items for the started workflow, and the nodes to which the one or more items are associated. The workflow program then performs a loop at blocks 460 through 490 for each node i in the workflow, as determined from the list of work items by node. For each node i, the workflow program performs a loop at block 462 to 488 for each work item j associated with node i. If (at block 464) there is a notification for the work item and the user that is the owner of the item, as determined from the methods, then the workflow program retrieves (at block 466) retrieves the notification and then starts a monitor to determine if the time period for the notification has elapsed without the work item completing. From block 464 or 466, the workflow program calls (at block 468) the checkOut method to lock the work item j. The inContainer method is called (at block 470) to access any container associated with the work item j. Once the work item j is locked, the workflow program then executes (at block 474) the actions associated with the work item j.

Control then proceeds to block 476 in FIG. 5, where the workflow program calls container get and set methods to access or modify the data and variables in the container accessed for the work item j in response to executing actions assigned to that work item j. For instance, as part of performing actions for a work item, the user of the work item may read and write data to the container. The workflow program receives (at block 482) indication from a user that the actions associated with the work item have completed. The workflow program further calls (at block 486) the checkIn method to release the lock on the work item j and the outContainer method to generate a new container including any updates to provide to the user at the next node in the workflow. The handle to the new container would be used in the next called checkOut method to provide the container to the user at the next node of the workflow. If there are further work items for the node i, then control proceeds (at block 488) back to block 452 to retrieve the next work item. After completing all the work items for node i, control proceeds (at block 490) back to block 460 to process the next node in the worklist.

The above described logic utilized workflow related classes and the methods therein to implement a workflow and obtain information thereon. The workflow server 6, or some other component in the workflow engine 2 (FIG. 1), would then translate the workflow objects and methods into application specific commands, such as Structured Query Language (SQL) commands to manipulate the data in the runtime database 4 and process template 8 to obtain information on the workflow and implement workflow operations.

Storing the Workflow Metadata in a Database

Figure 6:
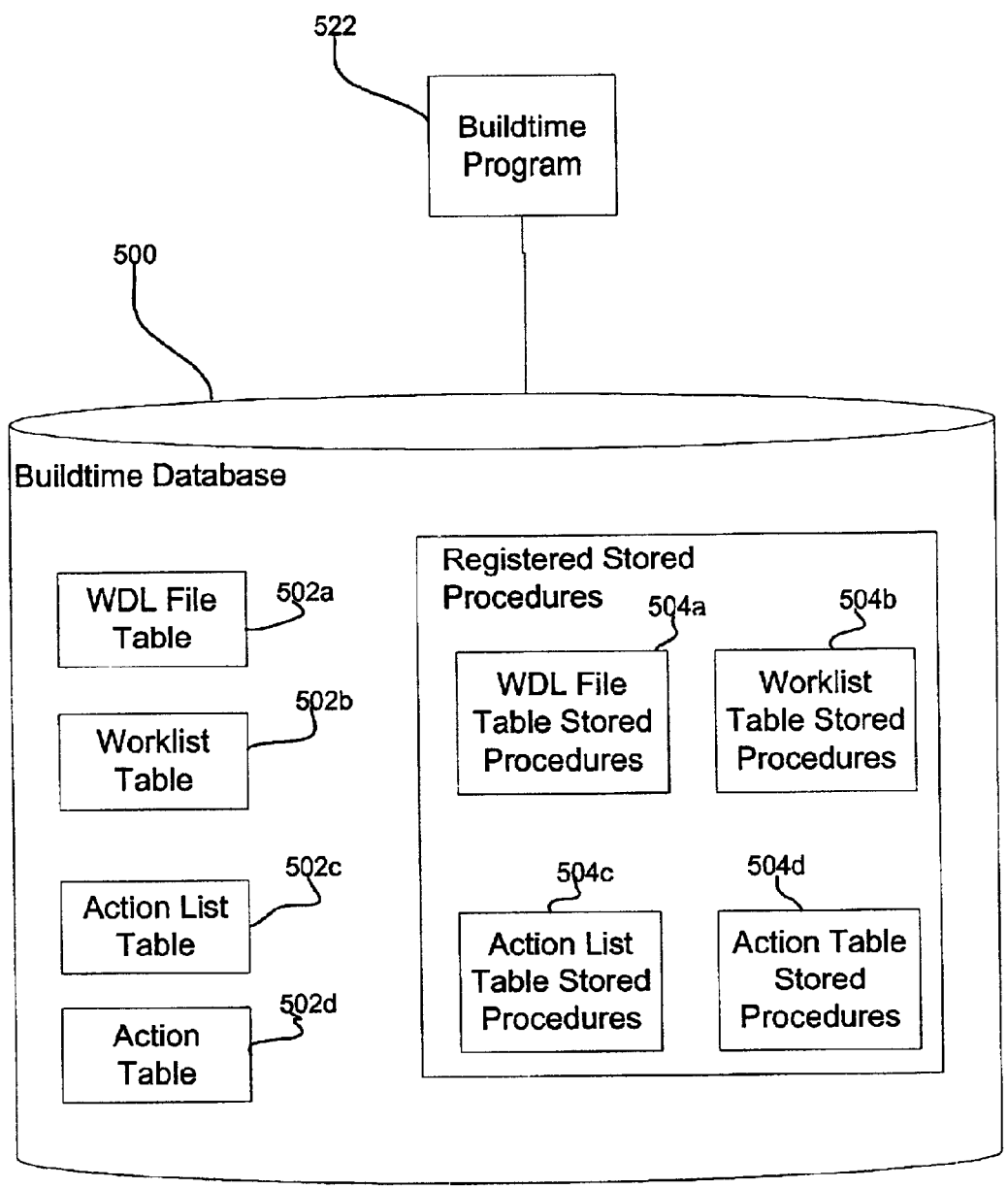
FIG. 6 illustrates an architecture of a buildtime program and buildtime database with implementations of the invention.

FIG. 6 illustrates a buildtime database 500 that is used to store WDL files 10 (FIG. 1), such as FDL files, generated by the buildtime program 522, which comprises the buildtime program 22 descried above with respect to FIG. 1. The workflow related data for one WDL file 10 are stored throughout four tables 502a, b, c, d in the database 500, including;

WDL File Table 502a: stores the actual WDL file generated by the workflow translator 26 (FIG. 1). The WDL file 10 is comprised of a string of characters.

The nodes of the workflow would comprise substrings within the WDL file 10.

Worklist Table 502b: each entry in the table includes a worklist name and another field including a list of work items, i.e., the units of work performed at each node defined within the workflow of the WDL file 10.

Action List Table 502c: Each entry includes a field to identify an action list name and another field including a list of action names to be performed at nodes in the workflow.

Action Table 502d: Each entry identifies one action that may be performed at a node, and for each action includes a pointer to the program that will perform the action, such as the file name and directory path of the program.

Each of the tables 502a, b, c, d would include workflow related metadata for different defined workflows, e.g., for different WDL files 10. Further, the tables 502a, b, c, d may store workflow related data from multiple buildtime programs 500 and/or for multiple users.

Figure 7:
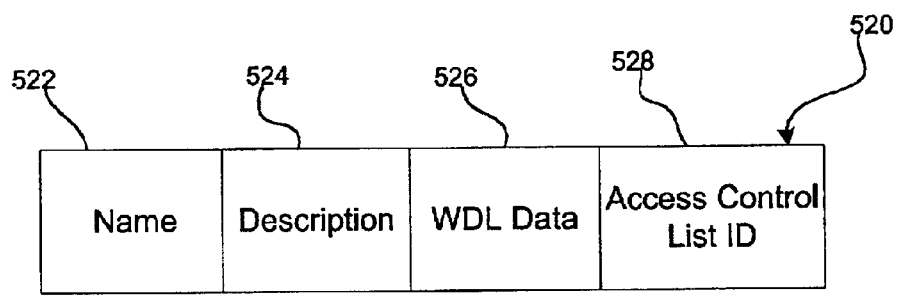
FIG. 7 illustrates an arrangement of a workflow file table in a database in accordance with implementations of the invention.

FIG. 7 lists the columns or fields included in the WDL file table 520, including:

Name 522: The file name of the WDL file. This name further indicates the location of the WDL file in the system.

Description 524: A brief description of the workflow defined by the WDL file.

WDL Data 526: comprises a large object including the actual WDL file code.

Access Control List ID 528: Identifies the access list, which provides the identities of users that can be assigned to perform actions associated with the nodes of the workflow defined in the WDL file.

In certain implementations, the workflow related tables 502a, b, c, d are manipulated using stored procedures registered with the buildtime database 500, wherein one set 504a, b, c, d of registered stored procedures is provided for each of the tables 502a, b, c, d. The stored procedures included in the sets 504a, b, c, d may comprise a block of procedural constructs and may include Structured Query Language (SQL) statements, i.e., an application program. Stored procedures are maintained at the database 500 for access and reuse. Further details of stored procedures are described in the publication"A Complete Guide to DB2 Universal Database," which was incorporated by reference above.

Each set 504a, b, c, d of stored procedures would include the following stored procedures:

Create includes SQL code to add a row of information to the workflow related table. For instance, the create method would be used to add a new WDL file to the WDL file table 502a.

Update: includes SQL code to update a current row in the workflow related table. For instance, the update method would be used to update one WDL file in the WDL file table 502a with new file data. The update may replace the entire WDL file or a portion thereof.

Delete includes SQL code to delete one or more rows from the workflow related table. For instance, the delete method would be used to delete one WDL file in the WDL file table 502a.

Get: includes SQL code to retrieve one or more rows of data. For instance, the get method may be used to retrieve on WDL file from the WDL file table 502a and forward such WDL file to the workflow engine 2 as shown and described with respect to FIG. 1. An additional stored procedure may be used to both retrieve and export the WDL file to the workflow engine 2.

List: includes SQL code to list the content of the table. For instance, the list stored procedure for the WDL file table 502a may list the name of each WDL file maintained in the table 502a.

Figure 8:
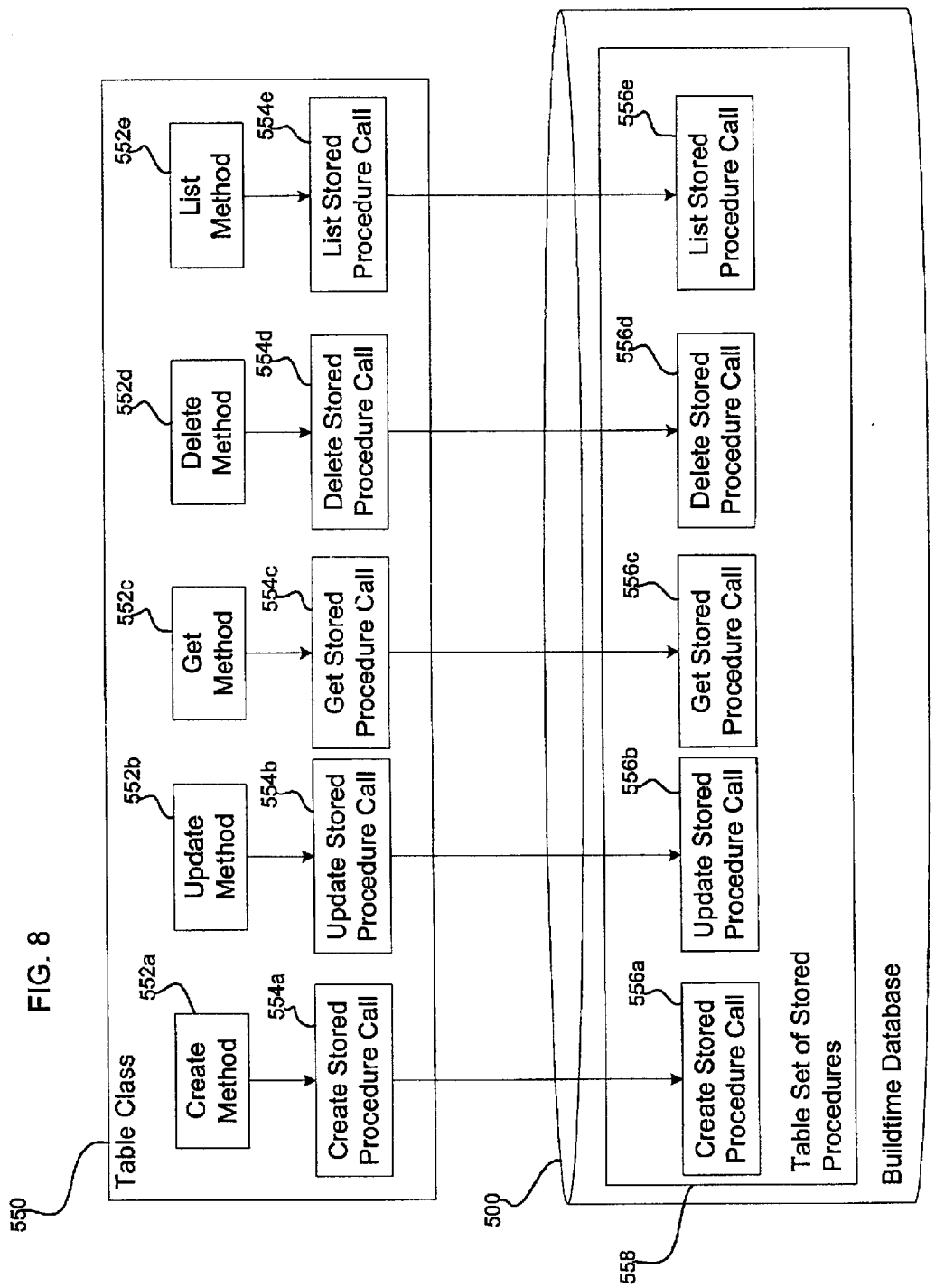
FIG. 8 illustrates a class architecture of methods to invoke database operations in accordance with implementations of the invention.

In certain implementations, an object oriented class is defined for each of the workflow related tables 502a, b, c, d, where each object oriented class includes methods that are capable of invoking a stored procedure call to further invoke the stored procedures in one of the registered sets 504a, b, c, d. FIG. 8 illustrates a table class 550 representing the class structure for one of the tables 502a, b, c, d, which includes a create, update, get, delete, and list methods 552a, b, c, d, e, respectively. Each method 552a, b, c, d, e maps to one corresponding stored procedure call 554a, b, c, d, e, respectively, that is used to invoke a corresponding stored procedure 556a, b, c, d, e in a set 558 of stored procedures registered in the buildtime database 500, such as sets 504a, b, c, d (FIG. 6). Each of the stored procedures 556a, b, c, d, e in the buildtime database 500 include SQL statements to perform the create, update, get, delete, and list methods, respectively for the specific table 502a, b, c, d for which the table class 550 is defined.

The object oriented class architecture of FIG. 8 allows buildtime program 522 or the user to use methods in a common object oriented language, such as Java, to trigger an associated stored procedure that includes a plurality of SQL statements to perform the function specified by the method on the particular table. This allows the buildtime program 522 or user to specify one method to invoke an underlying stored procedure to perform the specific manipulations of the database table to implement the method. In certain implementations, the methods for the different classes would include different names to distinguish the methods. For instance, the create method used to create an entry in the WDL file table 502a may have a slightly different name than the create method used to create an entry in the worklist table, e.g., CreateD for the WDL file table 502 and CreateWL for the worklist table 502b. character(s) to distinguish from the same type of methods used to The above described table class architecture provides the methods to allow the buildtime program 522 or user to manage workflow files (WDL files) and other related workflow data in a database before the WDL file is exported to a workflow engine 2 (FIG. 1) to implement in a runtime database 4.

Figure 9:
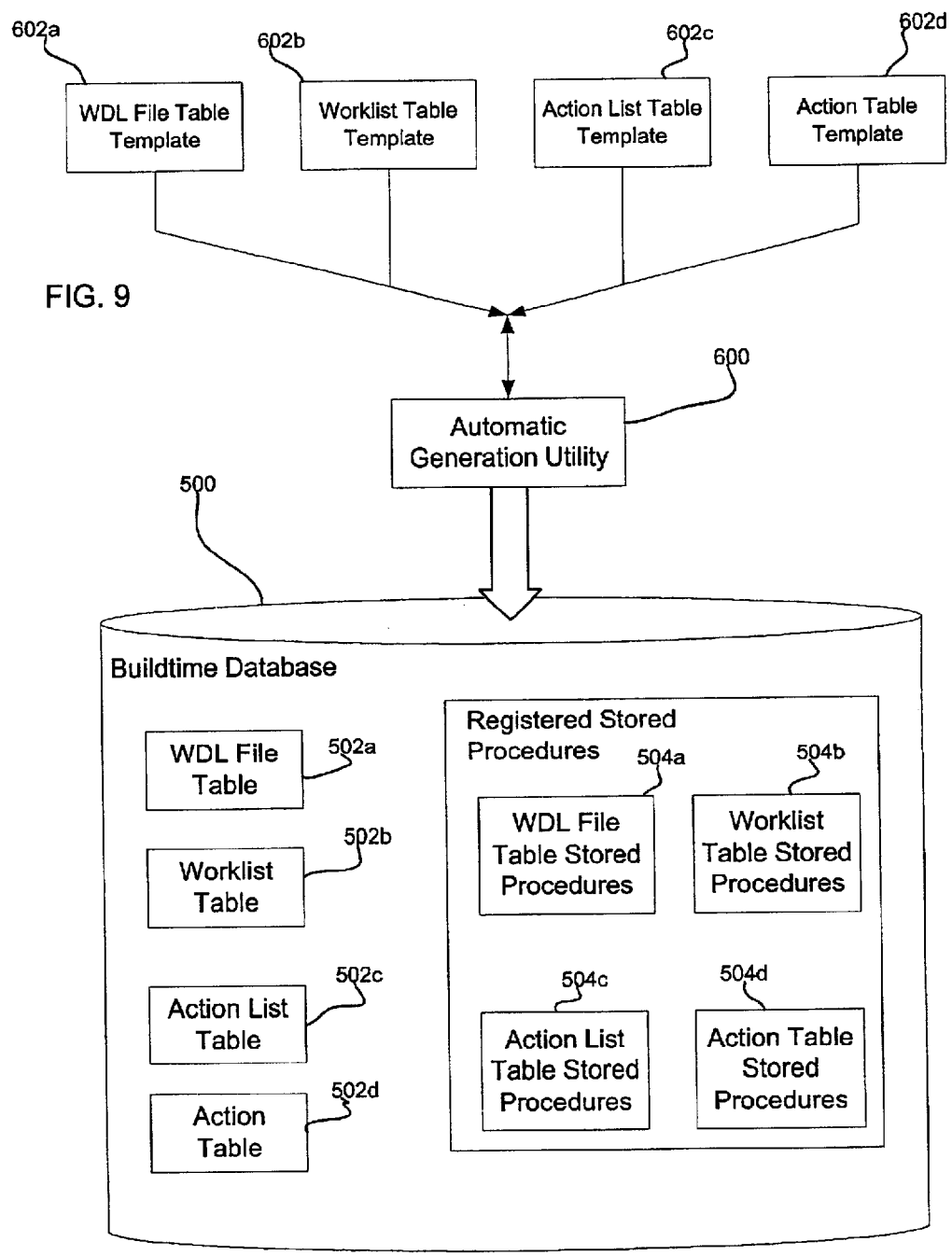
FIG. 9 illustrates how an architecture for generating database tables and stored procedures in accordance with implementations of the invention.

FIG. 9 illustrates an additional implementation where an automatic generation utility 600 included in the builder program 522 automatically generates the workflow related tables 502a, b, c, d and sets 504a, b, c, d, of stored procedures in the buildtime database 500. The automatic generation utility 600 would receive from the user one template 602a, b, c, d for each type, e.g., WDL file, worklist, action list, action, of database table 502a, b, c, d and associated set 504a, b, c, d of stored procedures to manipulate such table. Each template 602a, b, c, d specifies the definition of each column in the table. For instance, the WDL file template 602a may include fields in which the workflow developer provides column definitions for each column in the actual database table 502a, such as the fields 522–528 shown in FIG. 7. Below is an example of values the workflow developer may provide for each of the fields in the template 602a:

| | |
|---|---|
| name | VARCHAR(100) |
| description | VARCHAR(200) |
| WDL data | LOB (131072) |
| Access Control List ID | VARCHAR(20) |

Thus, through the templates 602a, b, c, d the definition of the columns in the tables 502a, b, c, d would be provided, including the data type and length for each column.

Figure 10:
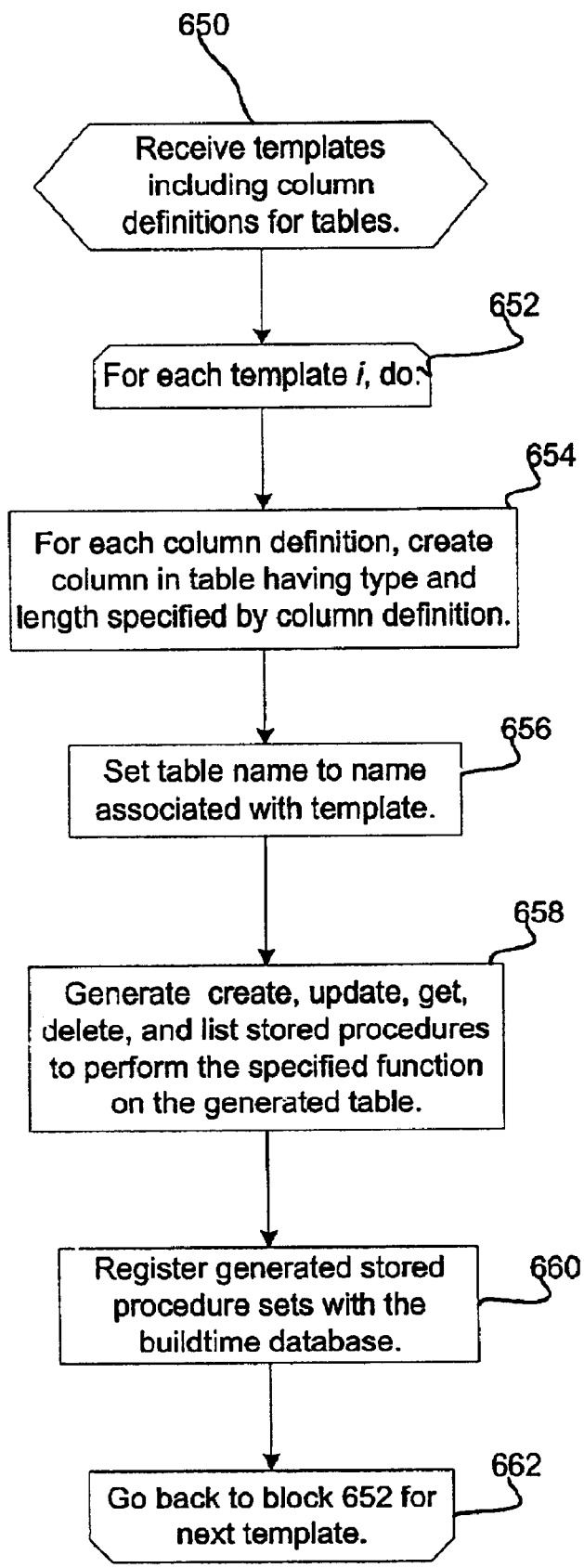
FIG. 10 illustrates logic for generating the database tables and stored procedures in accordance with implementations of the invention.

FIG. 10 illustrates logic implemented in the automatic generation utility 600 to generate the tables 502a, b, c, d and sets 504a, b, c, d of stored procedures based on the table definitions provided in the templates 602a, b, c, d. Control begins at block 650 upon receiving the templates 602a, b, c, d including the column definitions for the tables 502a, b, c, d. For each template i, a loop is performed at blocks 652 through 662 to generate the table and set of stored procedures, including the create, update, get, delete, stored procedures for table i, which may comprise one of the WDL file table 502a, worklist table 502b, action list table 502c, and action table 502d. For each column definition included in template i, the automatic generation utility 600 creates (at block 654) a column for the data type and length specified in the column definition in the template i. The created table name is set (at block 656) to the name associated with the template i. For instance, if the template i is named the WDL file table template, then the name of the created table would be the WDL file table. The create, update, get, delete, and list stored procedures are then generated (at block 658) to perform the specific manipulation on the created table, i.e., are designed to perform operations on the columns as specified by the column definitions in template i. The generated sets 504a, b, c, d of stored procedures are then registered (at block 660) with the buildtime database 500.

In the described implementations, an object oriented class includes methods 552a, b, c, d for a table class 550 associated with the created table, e.g., a WDL file table class, worklist table class, etc. The methods 552a, b, c, d for each table class 550 (FIG. 8) map to the stored procedure calls 554a, b, c, d that are used to invoke the stored procedures 556a, b, c, d generated by the automatic generation utility 600. The object oriented table classes 550 including the methods 552a, b, c, d and the stored procedure calls 554a, b, c, d would be provided by the vendor of the workflow engine for use by the buildtime program 522 or a user to invoke the stored procedures 556a, b, c, d generated by the automatic generation utility 500.

Thus, the described implementations provide techniques for storing workflow source files, such as FDL, WDL files, and other workflow related metadata, e.g., worklists, action lists, actions, etc., in a database in a manner that allows an application or user to access the workflow related tables using object oriented methods. A call to one object oriented methods invokes one stored procedure in the buildtime database 500 that executes SQL statements to perform the function associated with the method, e.g., create, update, retrieve, list, delete, etc.

Further implementations provide a technique for automatically generating the stored procedures and database tables in response to user input specifying the column definitions, e.g., data type and length, for the workflow related tables.

Additional Implementation Details

The preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The buildtime program 522 may be part of any vendor workflow program known in the art.

In the described implementations, the actions were implemented as Java methods. Alternatively, the actions may be implemented in any programming language known in the art.

In the described implementations, the table classes and methods therein are implemented as an object oriented class architecture. Alternatively, non-object oriented programming techniques may be used to implement the described class architecture.

In the described implementations, the methods concerned specific database operations that may be invoked through the table class methods and implemented in stored procedures. Additional database methods and corresponding stored procedures for operating on the workflow to implement the functions of the methods may be provided.

In the described implementations, the automatic generation utility was used to create tables and stored procedures for manipulating workflow related data in the tables. However, those skilled in the art will appreciate that the architecture and operations of the automatic generation utility may be applied to generate tables and associated stored procedures to manipulate any type of data, not just workflow related data.

In the described implementations, different database tables and table structures were described for storing workflow files as well as other workflow related data. Those skilled in the art will appreciate that the data described in the four separate tables may be merged into fewer than four tables or dispersed throughout more than four tables, and the data in the tables may be arranged with different table designs than those described herein.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

**MQSeries, IBM, and DB2 are registered trademarks of International Business Machines Corp.; Microsoft and Microsoft SQL Server are trademarks of Microsoft Corporation; ORACLE is a trademark of the Oracle Corporation; JAVA is a trademark of sun Microsystems, inc.

What is claimed is:

1. A method for maintaining workflow related information, comprising:

providing at least one table in a database storing workflow related data;

providing a plurality of programming interfaces, wherein each programming interface specifies an operation to perform on the workflow related data in the at least one table, wherein each programming interface is associated with one stored procedure call;

providing in the database one stored procedure for each stored procedure call and corresponding method, wherein the one stored procedure includes a plurality of database statements to perform the programming interface operation; and executing the one stored procedure in the database to perform the corresponding programming interface operation on workflow related data in one table.

2. The method of claim 1, wherein one provided table comprises a workflow file table including entries of workflow files, wherein each workflow file includes code defining an entire workflow, including nodes and workflow parameters.

3. The method of claim 2, further comprising:
providing one table including information on actions associated with one workflow file in the workflow file table, wherein the associated actions are capable of being performed at the nodes defined in the associated workflow file.

4. The method of claim 1, further comprising:
receiving workflow related data from a workflow builder program, wherein the workflow builder program calls the programming interfaces to invoke the associated stored procedure calls and the stored procedures to perform the programming interface operations on the at least one table of workflow related data.

5. The method of claim 4, wherein one table comprises a workflow file table, wherein each entry of the workflow file table includes a workflow file including code defining an entire workflow, including nodes and workflow parameters, wherein the workflow files in the workflow file tables are generated by the builder program.

6. The method of claim 5 further comprising:
executing one stored procedure to retrieve one workflow file in response to receiving a stored procedure call invoked by a programming interface from the buildtime program to retrieve one workflow file, wherein the build time program exports the retrieved workflow file to a workflow engine.

7. The method of claim 1, wherein an automatic generation utility is capable of receiving one template for the at least one table corresponding to the one stored procedure and based on the received template is capable of performing:
(i) generating the at least one table in the database storing workflow related data; and
(ii) generating the one stored procedure for each stored procedure call and corresponding method.

8. The method of claim 7, wherein the one template includes column definition for the at least one table, and wherein the one template is provided via an input from an user.

9. The method of claim 5, wherein the workflow files are implemented in the FlowMark Definition Language (FDL).

10. The method of claim 1, wherein there are plurality of tables including workflow related data, wherein a set of programming interfaces are provided for each table including workflow related data, and wherein each set of programming interfaces defines a same set of operations to perform on the table for which the set is provided.

11. A method for maintaining workflow related information, comprising:
providing a plurality of tables including workflow related data;
providing a set of programming interfaces for each table including workflow related data, wherein each set of programming interfaces defines a same set of operations to perform on the table for which the set is provided, wherein each programming interface is associated with one stored procedure call; and
providing stored procedure calls and stored procedures in the database for each set of programming interfaces to implement the programming interface operations in the set, wherein one stored procedure is provided for each stored procedure call and corresponding method, and wherein the one stored procedure includes a plurality of database statements to perform a programming interface operation; and
executing the one stored procedure in the database to perform the corresonding programming interface operation on workflow related data in one table.

12. The method of claim 11, wherein the programming interfaces for each table are members of a table class, wherein there is one table class for each table including workflow related data.

13. The method of claim 11, wherein the workflow related tables comprise:
a workflow file table, wherein each entry includes one workflow file including code defining a workflow and nodes of the workflow;
a worklist table, wherein each entry includes a worklist associated with a plurality of work items performed at the nodes defined in the associated workflow files; and
an action list table, wherein each entry includes a list of actions capable of being performed at the nodes defined within one workflow file in the workflow file table.

14. The method of claim 13, wherein the workflow related tables further comprise:
an action table, wherein each entry includes one action name and an address of a program implementing the action, wherein every action listed in the entries of the action list table are defined in the action table.

15. The method of claim 11, wherein each set of programming interfaces includes:
a create programming interface to invoke one stored procedure to create an entry of workflow related data in the table associated with the set;
a get programming interface to invoke one stored procedure to retrieve one entry of workflow related data from the table associated with the set;
an update programming interface to invoke one stored procedure to update one entry of workflow related data in the table associated with the set;
a delete programming interface to invoke one stored procedure to delete one entry of workflow related data in the table associated with the set; and
a list programming interface to invoke one stored procedure to list a description of all entries of workflow related data in the table associated with the set.

16. A system for maintaining workflow related information, comprising:
a storage device;
a database in the storage device including at least one table storing workflow related data;
a computer readable medium including a plurality of programming interfaces, wherein each programming interface specifies an operation to perform on the workflow related data in the at least one table, wherein each programming interface is associated with one stored procedure call in the computer readable medium;
means for providing one stored procedure in the database for each stored procedure call and corresponding programming interface, wherein the one stored procedure includes a plurality of database statements to perform the programming interface operation; and
means for executing the one stored procedure in the database to perform the corresponding programming interface operation on workflow related data in one table.

17. The system of claim 16, wherein one provided table comprises a workflow file table includiiig entries of workflow files, wherein each workflow file includes code defining an entire workflow, including nodes and workflow parameters.

18. The system of claim 16, further comprising:
one table in the database including information on actions associated with one workflow file in the workflow file table, wherein the associated actions are capable of being performed at the nodes defined in the associated workflow file.

19. The system of claim 16, further comprising:

means for receiving workflow related data from a workflow builder program, wherein the workflow builder program calls the programming interfaces to invoke the associated stored procedure calls and the stored procedures to perform the programming interface operations on the at least one table of workflow related data.

20. The system of claim 19, wherein one table in the database comprises a workflow file table, wherein each entry of the workflow file table includes a workflow file including code defining an entire workflow, including nodes and workflow parameters, wherein the workflow files in the workflow file tables are generated by the builder program.

21. The system of claim 20, further comprising:

means for executing one stored procedure to retrieve one workflow file in response to receiving a stored procedure call invoked by a programming interface from the buildtime program to retrieve one workflow file, wherein the build time program exports the retrieved workflow file to a workflow engine.

22. The system of claim 20, wherein the workflow files are implemented in the FlowMark Definition Language (FDL).

23. The system of claim 16, further comprising:

an automatic generation utility that is capable of receiving one template for the at least one table corresponding to the one stored procedure and based on the received template is capable of performing:

(i) generating the at least one table in the database storing workflow related data; and (ii) generating the one stored procedure for each stored procedure call and coirresponding method.

24. The system of claim 23, wherein the one template includes column definition for the at least one table, and wherein the one template is provided via an input from an user.

25. The system of claim 16, wherein there are plurality of tables including workflow related data, wherein a set of programming interfaces are provided for each table including workflow related data, and wherein each set of programming interfaces defines a same set of operations to perform on the table for which the set is provided.

26. A system for maintaining workflow related information, comprising:

a storage device;

a database in the storage device including a plurality of tables including workflow related data in the database;

a computer readable medium including a set of programming interfaces for each table including workflow related data, wherein each set of programming interfaces defines a same set of operations to perform on the table for which the set is provided, wherein each programming interface specifies an operation to perform on the workflow related data in the at least one table, wherein each programing interface is associated with one stored procedure call in the computer readable medium;

means for providing stored procedure calls and stored procedures in the database for each set of programming interfaces to implement programming interface operations in the set, wherein one stored procedure is provided for each stored procedure call and corresponding method, and wherein the one stored procedure includes a plurality of database statements to perform a programming interface operation; and means for executing the one stored procedure in the database to perform the corresponding programming interface operation on workflow related data in one table.

27. The system of claim 26, wherein the programming interfaces for each table are members of a table class, wherein there is one table class for each table including workflow related data.

28. The system of claim 26, wherein the workflow related tables in the database comprise:

a workflow file table, wherein each entry includes one workflow file including code defining a workflow and nodes of the workflow;

a worklist table, wherein each entry includes a workflow associated with a plurality of work items performed at the nodes defined in the associated workflow files; and an action list table, wherein each entry includes a list of actions capable of being performed at the nodes defined within one workflow file in the workflow file table.

29. The system of claim 28, wherein the workflow related tables in the database further comprise:

an action table, wherein each entry includes one action name and an address of a program implementing the action, wherein every action listed in the entries of the action list table are defined in the action table.

30. The system of claim 26, wherein each set of programming interfaces in the computer readable medium includes:

a create programming interface to invoke one stored procedure to create an entry of workflow related data in the table associated with the set;

a get programming interface to invoke one stored procedure to retrieve one entry of workflow related data from the table associated with the set;

an update programming interface to invoke one stored procedure to update one entry of workflow related data in the table associated with the set;

a delete programming interface to invoke one stored procedure to delete one entry of workflow related data in the table associated with the set; and a list programming interface to invoke one stored procedure to list a description of all entries of workflow related data in the table associated with the set.

31. An article of manufacture including code for maintaining workflow related information by:

providing at least one table in a database storing workflow related data;

providing a pluraiity of programming interfaces, wherein each programming interface specifies an operation to perform on the workflow related data in the at least one table, wherein each programming interface is associated with one stored procedure call;

providing in the database one stored procedure for each stored procedure call and corresponding programming interface, wherein the one stored procedure includes a plurality of database statements to perform the programming interface operation; and executing the one stored procedure in the database to perform the corresponding programming interface operation on workflow related dnta in one table.

32. The article of manufacture of claim 31, wherein one provided table comprises a workflow file table including entries of workflow files, wherein each workflow file includes code defining an entire workflow, including nodes and workflow parameters.

33. The article of manufacture of claim 32, further comprising one table including information on actions associated with one workflow file in the workflow file table, wherein the associated actions are capable of being performed at the nodes defined in the associated workflow file.

34. The article of manufacture of claim 31, further comprising:

receiving workflow related data from a workflow builder program, wherein the workflow builder program calls the programming interfaces to invoke the associated stored procedure calls and the stored procedures to perform the programming interface operations on the at least one table of workflow related data.

35. The article of manufacture of claim 34, wherein one table comprises a workflow file table, wherein each entry of the workflow file table includes a workflow file including code defining an entire workflow, including nodes and workflow parameters, wherein the workflow files in the workflow file tables are generated by the builder program.

36. The article of manufacture of claim 35, further comprising:

executing one stored procedure to retrieve one workflow file in response to receiving a stored procedure call invoked by a programming interface from the buildtime program to retrieve one workflow file, wherein the build time program exports the retrieved workflow file to a workflow engine.

37. The article of manufacture of claim 35, wherein the workflow files are implemented in the FlowMark Definition Language (FDL).

38. The article of manufacture of claim 31, wherein an automatic generation utility is capable of receiving one template for the at least one table corresponding to the one stored procedure and based on the received template is capable of performing:

(i) generating the at least one table in the database storing workflow related data; and (ii) generating the one stored procedure for each stored procedure call and corresponding method.

39. The article of manufacture of claim 38, wherein the one template includes column definition for the at least one table, and wherein the one template is provided via an input from an user.

40. The article of manufacture of claim 31, wherein there are plurality of tables including workflow related data, wherein a set of programming interfaces are provided for each table including workflow related data, and wherein each set of programming interfaces defines a same set of operations to perform on the table for which the set is provided.

41. An article of manufacture including code for maintaining workflow related information by:

providing a plurality of tables including workflow related data;

providing a set of programming interfaces for each table including workflow related data, wherein each set of programming interfaces defines a same set of operations to perform on the table for which the set is provided, wherein each programming interface is associated with one stored procedure call; and providing stored procedure calls and stored procedures in the database for each set of programming interfaces to implement the programming interface operations in the set, wherein one stored procedure is provided for each stored procedure call and corresponding method, and wherein the one stored procedure includes a plurality of database statements to perform a programming interace operations; and executing the one stored procedure in the database to perform the corresponding programming interface operation on workflow related data in one table.

42. The article of manufacture of claim 41, wherein the programming interfaces for each table are members of a table class, wherein there is one table class for each table including workflow related data.

43. The article of manufacture of claim 41, wherein the workflow related tables comprise:

a workflow file table, wherein each entry includes one workflow file including code defining a workflow and nodes of the workflow;

a worklist table, wherein each entry includes a worklist associated with a plurality of work items performed at the nodes defined in the associated workflow files; and an action list table, wherein each entry includes a list of actions capable of being performed at the nodes defined within one workflow file in the workflow file table.

44. The article of manufacture of claim 43, wherein the workflow related tables further comprise:

an action table, wherein each entry includes one action name and an address of a program implementing the action, wherein every action listed in the entries of the action list table are defined in the action table.

45. The article of manufacture of claim 41, wherein each set of programming interfaces includes:

a create programming interface to invoke one stored procedure to create an entry of workflow related data in the table associated with the set;

a get programming interface to invoke one stored procedure to retrieve one entry of workflow related data from the table associated with the set;

an update programming interface to invoke one stored procedure to update one entry of workflow related data in the table associated with the set;

a delete programming interface to invoke one stored procedure to delete one entry of workflow related data in the table associated with the set; and a list programming interface to invoke one stored procedure to list a description of all entries of workflow related data in the table associated with the set.

\* \* \* \* \*

UNITED STATES PATENT AND TRADEMARK OFFICE
CERTIFICATE OF CORRECTION

PATENT NO. : 6,920,456 B2
APPLICATION NO. : 09/918144
DATED : July 19, 2005
INVENTOR(S) : Taejae Lee, Jy-Jine James Lin and Alan Tsu-I Yaung It is certified that error appears in the above-identified patent and that said Letters Patent is hereby corrected as shown below:

Column 17, line 59, after "implement", delete "the".
Line 66, delete "corresonding" and insert -- corresponding -- .

Column 18, line 12, delete "dcfined" and insert -- defined -- .
Line 61, delete "includiiig" and insert -- including -- .

Column 20, line 50, delete "pluraiity" and insert -- plurality -- .
Line 62, delete "dnta" and insert -- data -- .

Signed and Sealed this

Twelfth Day of June, 2007

JON W. DUDAS
*Director of the United States Patent and Trademark Office*